United States Patent
Höfer et al.

(10) Patent No.: US 12,483,078 B2
(45) Date of Patent: Nov. 25, 2025

(54) ELECTRIC MOTOR FOR DRIVING A VEHICLE FLAP, USE AND METHOD OF MANUFACTURING OF THE ELECTRIC MOTOR

(71) Applicant: STABILUS GMBH, Koblenz (DE)

(72) Inventors: Florian Höfer, Neuwied (DE); Marian Bochen, Eitelborn (DE); Axel Knopp, Eitelborn (DE); Sergei Mazepa, Kaisersesch (DE); Magnus Hümmerich, Dierdorf (DE)

(73) Assignee: STABILUS GMBH, Koblenz (DE)

( * ) Notice: Subject to any disclaimer, the term of this patent is extended or adjusted under 35 U.S.C. 154(b) by 332 days.

(21) Appl. No.: 18/093,401

(22) Filed: Jan. 5, 2023

(65) Prior Publication Data

US 2023/0223800 A1   Jul. 13, 2023

(30) Foreign Application Priority Data

Jan. 10, 2022   (DE) ..................... 10 2022 100 369.8

(51) Int. Cl.
*H02K 1/17*   (2006.01)
*H02K 21/24*   (2006.01)

(52) U.S. Cl.
CPC ............... *H02K 1/17* (2013.01); *H02K 21/24* (2013.01)

(58) Field of Classification Search
CPC ...... H02K 7/104; H02K 7/106; H02K 49/043; H02K 49/065; H02K 49/104;
(Continued)

(56) References Cited

U.S. PATENT DOCUMENTS

2006/0043811 A1 * 3/2006 Ong ..................... H02K 1/278
310/156.08
2011/0254394 A1   10/2011 Piaton
(Continued)

FOREIGN PATENT DOCUMENTS

DE   2735763 A1   2/1979
DE   10125836 A1 * 11/2002   ............. H02K 7/106
(Continued)

OTHER PUBLICATIONS

Machine translation of DE10125836A1. (Year: 2002).*

*Primary Examiner* — Michael Andrews
(74) *Attorney, Agent, or Firm* — Schmeiser, Olsen & Watts, LLP

(57) ABSTRACT

An electric motor for driving a vehicle flap is provided, the electric motor including a hollow-cylindrical shaped stator made of a permanent-magnetic material and arranged coaxially to a motor axis, a motor shaft disposed coaxially with the motor axis and at least partially within the stator and mounted for rotation relative to the stator about the motor axis, and a drive rotor disposed within the stator and mounted on the motor shaft and including a plurality of coils for driving rotation of the motor shaft relative to the stator about the motor axis. The electric motor includes a braking rotor disposed in the stator, mounted on the motor shaft along the motor axis adjacent the drive rotor, the brake rotor being magnetisable by the stator. Use of the electric motor for driving a vehicle flap and to a method of manufacturing the electric motor is also provided.

10 Claims, 4 Drawing Sheets

(58) Field of Classification Search
CPC .......... H02K 49/106; H02K 1/17; H02K 1/26;
H02K 1/265; H02K 1/278; H02K 1/2781;
H02K 1/2783; H02K 21/24; H02K 21/28;
H02K 21/30
USPC ........................................................ 310/152
See application file for complete search history.

(56) References Cited

U.S. PATENT DOCUMENTS

| | | | | |
|---|---|---|---|---|
| 2012/0080968 | A1* | 4/2012 | Knight | H02K 7/106 |
| | | | | 310/76 |
| 2015/0040698 | A1* | 2/2015 | Kessler | H02K 11/215 |
| | | | | 74/89 |
| 2018/0233977 | A1* | 8/2018 | Volkmuth | H02K 9/197 |
| 2020/0370357 | A1* | 11/2020 | Schmengler | E05F 15/622 |
| 2022/0278598 | A1* | 9/2022 | Ohba | H02K 1/2706 |

FOREIGN PATENT DOCUMENTS

| | | | |
|---|---|---|---|
| DE | 10 2015 221 067 A1 | 5/2017 | |
| DE | 10 2017 128 390 A1 | 6/2019 | |
| DE | 10 2021 129 209 B3 | 10/2022 | |
| DE | 10 2021 129 217 B3 | 10/2022 | |
| DE | 10 2022 107 315 A1 | 10/2022 | |
| EP | 1940012 A1 * | 7/2008 | ............... H02K 7/06 |
| EP | 2 192 675 A1 | 6/2010 | |
| JP | 5 748 688 B2 | 9/2013 | |
| WO | 2019/138068 A1 | 7/2019 | |

* cited by examiner

ELECTRIC MOTOR FOR DRIVING A VEHICLE FLAP, USE AND METHOD OF MANUFACTURING OF THE ELECTRIC MOTOR

CROSS-REFERENCE TO RELATED APPLICATIONS

This application claims priority to German Application No. 10 2022 100 369.8, having a filing date of Jan. 10, 2022, the entire contents of which are hereby incorporated by reference.

FIELD OF TECHNOLOGY

The following relates to an electric motor for driving a vehicle flap, the electric motor comprising a stator of a permanent magnetic material formed into a hollow cylindrical shape and disposed coaxially with a motor axis, a motor shaft disposed coaxially with the motor axis and at least partially within the stator and mounted for rotation relative to the stator about the motor axis, and a drive rotor disposed within the stator and mounted on the motor shaft and comprising a plurality of coils for driving a rotation of the motor shaft relative to the stator about the motor axis.

The following also relates to a use of the electric motor for driving a vehicle flap and to a method of manufacturing the electric motor.

BACKGROUND

From the publications US 2011/0254394 A1, WO 2019/138068 A1, EP 2 192 675 A1 and EP 1 940 012 A1 electric motors are known which comprise a hysteresis brake for braking a rotation of a motor shaft of the electric motor. A hysteresis brake comprises a rotor attached to the motor shaft and a stator attached to a housing of the electric motor, wherein the rotor is designed as a permanent magnet and the stator can be magnetised by the rotor or vice versa. When the rotor rotates relative to the stator, the stator is thereby remagnetised, converting kinetic energy of the rotor into heat and braking the rotation of the rotor.

Compared to a mechanical friction brake, a hysteresis brake is characterised by low wear and low noise. The disadvantage of known electric motors with hysteresis brakes is that they are more expensive and more complex to manufacture than electric motors with friction brakes.

SUMMARY

An aspect relates to an electric motor and a manufacturing method therefor, wherein the electric motor comprises a low-wear and quiet brake and is particularly easy and inexpensive to manufacture. It is also an aspect of the invention to provide a low-wear, quiet and inexpensive method for driving a vehicle flap.

The electric motor according to embodiments of the invention are designed for driving a vehicle flap, for example for opening and/or closing a door, a boot lid or an engine bonnet of a motor vehicle.

The electric motor comprises a hollow-cylindrical shaped stator made of a permanent-magnetic material and arranged coaxially to a motor axis. In embodiments, the stator may be formed in one piece so that the electric motor can be assembled particularly easily.

The stator can be composed of several stator modules, for example in order to be able to adjust a magnetic field strength of the stator in a modular way.

The stator comprises a number of alternating magnetic north poles and south poles in the direction of rotation around the motor axis. In an embodiment, the stator comprises at least two magnetic north poles and two magnetic south poles to ensure a uniform driving effect and braking effect.

A lateral cylinder wall of the stator is closed. Alternatively, the lateral cylinder wall can be perforated, for example slotted along the motor axis.

The electric motor comprises a motor shaft arranged coaxially to the motor axis and at least partially in the stator and mounted rotatably relative to the stator about the motor axis. In embodiments, the motor shaft may be rotatably mounted relative to a surrounding area of the electric motor, so that the electric motor is designed as an internal rotor motor. Alternatively, the stator can be rotatably mounted relative to a surrounding area of the electric motor, so that the electric motor is designed as an external rotor motor.

The electric motor comprises a drive rotor arranged in the stator and mounted on the motor shaft, comprising a number of coils for driving a rotation of the motor shaft relative to the stator about the motor axis. In an embodiment, the rotation is driven by a magnetic interaction of a magnetic field generated by an electric current in the coils with a magnetic field of the stator. The power supply to the coils can be designed as for conventional electric motors.

In embodiments, the coils may be wound on at least one armature fixed on the motor shaft.

When the drive rotor rotates with the motor shaft about the motor axis, the drive rotor forms a hollow cylindrical body of rotation coaxial with the motor axis and having an outer radius radially to the motor axis which is slightly smaller, for example 0.1 mm to 1 mm smaller, in particular 0.2 mm to 0.6 mm smaller, 0.3 mm smaller, than an inner radius of the stator radially to the motor axis. This allows the drive rotor to rotate frictionlessly in the stator while having a high magnetic interaction with the stator.

In embodiments, the electric motor comprises a brake rotor arranged in the stator, fixed along the motor axis next to the drive rotor on the motor shaft and magnetisable by the stator.

When the stator magnetises the brake rotor, this creates a magnetic interaction between the stator and the brake rotor that counteracts rotation of the brake rotor relative to the stator. The stator and the brake rotor thus act together as a hysteresis brake. The braking effect occurs independently of a power supply to the electric motor, so that a particularly high level of safety is guaranteed. Once the brake rotor is magnetised, the magnetic interaction between the brake rotor and the stator also prevents the brake rotor from starting to rotate relative to the stator when the electric motor is stationary. This can prevent, for example, a vehicle flap driven by the electric motor from closing by its weight force alone, which could lead to a risk of injury.

When the brake rotor rotates with the motor shaft around the motor axis, the brake rotor forms a hollow cylindrical body of rotation coaxial with the motor axis. In an embodiment, the brake rotor is hollow-cylindrical in shape and arranged coaxial with the motor axis. An outer radius of the body of rotation or of the brake rotor radially to the motor axis is slightly smaller, for example 0.1 mm to 1 mm smaller, in particular 0.2 mm to 0.6 mm smaller, 0.3 mm smaller, than an inner radius of the stator radially to the motor axis.

This allows the brake rotor to rotate frictionless in the stator while having a high magnetic interaction with the stator.

In embodiments, the brake rotor and the drive rotor may each be hollow-cylindrical in shape, coaxial with the motor axis and arranged side by side along the motor axis, and rotatable relative to the motor shaft about the motor axis, the stator being arranged in sections in the brake rotor and in the drive rotor respectively and fixed on the motor shaft. A disadvantage of this embodiment is that with the same outer radius of the electric motor radially to the motor axis, the gap between the brake rotor and the stator is closer to the motor axis, so that the magnetic interaction between the brake rotor and the stator causes a lower braking torque on the motor shaft. Thus, if a certain braking torque is required for an application, the electric motor becomes larger, heavier and more expensive.

Since both the drive rotor and the brake rotor interact magnetically with the same stator, no separate stators are required for the drive and for the hysteresis brake, so that the electric motor is particularly simple, compact and light and can be manufactured at particularly low cost. Furthermore, all magnetic components of the electric motor can be easily enclosed in a common housing, which can be used, for example, to protect the components from foreign bodies and/or to magnetically shield the magnetic components from an environment of the electric motor.

In embodiments, the brake rotor may be made of a soft magnetic material so that the brake rotor can be magnetised by the stator. For example, the brake rotor is made of an aluminium-nickel-cobalt alloy, an iron-chromium-cobalt alloy or another material known from common hysteresis brakes.

An outer radius of the brake rotor radial to the motor axis corresponds to an outer radius of the drive rotor radial to the motor axis. In this way, the space inside the stator is optimally utilised and the brake rotor is arranged as close as possible to the stator in order to achieve a strong magnetic interaction and thus a strong braking effect with the lowest possible material requirement and the lowest possible space requirement.

In embodiments, the brake rotor may be spaced radially to the motor axis from the motor shaft by a spacer sleeve. The braking effect of the hysteresis brake mainly comes about through the areas of the brake rotor that are located close to the stator, because the magnetic interaction with the stator and the lever arm for the braking torque acting on the motor shaft are greatest here. If the spacer sleeve is made of a material that cannot be magnetised by the stator, for example a plastic, this can reduce the cost and/or weight of the electric motor without significantly reducing the braking effect.

In embodiments, the spacer sleeve may be made of a plastic, polybutylene terephthalate or polyamide, polyamide 6.6. A particularly light spacer sleeve can be produced cost-effectively from a plastic in a form optimally adapted to the brake rotor and the motor shaft, for example by injection moulding. The plastics mentioned are characterised in particular by high strength, rigidity and dimensional stability, which means that the spacer sleeve can be securely fastened to the motor shaft and the brake rotor even at high rotational speeds and braking forces.

In embodiments, the spacer sleeve contains at least one recess to reduce thermal expansion of the spacer sleeve. Due to the rapid and repeated magnetisation of the brake rotor during operation of the electric motor, the brake rotor and the spacer sleeve can heat up considerably. Typically, the operating temperature of the brake rotor is in the range of −40° C. to +120° C. Since the coefficient of thermal expansion of typical materials for the brake rotor is smaller than the coefficient of thermal expansion of typical materials for the spacer sleeve, stresses can occur that could damage the components. This risk is reduced by the recess. For example, a brake rotor made of an aluminium-nickel-cobalt alloy has a coefficient of thermal expansion of $11 \cdot 10^{-6}$ $K^{-1}$. A spacer sleeve made of polyamide 6.6 has, for example, a coefficient of thermal expansion of $5 \cdot 10^{-5} K^{-1}$.

In embodiments, the spacer sleeve comprises an inner cylinder in contact with the motor shaft, coaxial with the motor axis, and an outer cylinder in contact with the brake rotor, coaxial with the motor axis. The outer cylinder is spaced from the inner cylinder radially to the motor axis and is connected to the inner cylinder only by a number of webs, for example 2, 4, 6, 8 or 10 webs. Recesses located between the webs allow the material of the spacer sleeve to expand without creating too much tension radial to the motor axis, which could damage the brake rotor. The webs do not run in a straight line radially to the motor axis but are curved. In this way, a stress generated by expansion of the material of the spacer sleeve and radial to the motor axis can be converted into a bending moment of the webs.

In embodiments, the spacer sleeve is positively connected to the motor shaft and/or the brake rotor with respect to a rotation around the motor axis and/or with respect to a translation along the motor axis. A positive connection has the advantage over an adhesive connection, for example, that it is resistant even under high thermal and/or mechanical loads, so that a particularly reliable braking effect and thus a particularly safe electric motor is achieved. Compared to a press connection, a positive connection has the advantage that the mechanical load on the connected components is lower, which is particularly advantageous for the typically brittle material of the brake rotor.

In embodiments, the spacer sleeve can, for example, be essentially hollow-cylindrical in shape and arranged coaxially to the motor axis. For positive connection of the spacer sleeve to the brake rotor, the spacer sleeve can, for example, have at least one groove running around the motor axis and/or a number of projections on an outer cylindrical surface of the spacer sleeve. The brake rotor may comprise a web shaped complementary to the groove and/or depressions shaped complementary to the projections to form a positive connection. The projections and/or the web are rounded to avoid stress concentration at edges that could lead to material overload.

In embodiments, the spacer sleeve comprises at least two, in particular at least four, projections that are evenly distributed around the motor axis and/or as small as possible so that complementary depressions in the brake rotor do not cause an uneven braking effect.

For the positive connection of the spacer sleeve to the motor shaft, an outer surface of the motor shaft can, for example, be flattened on one side, in particular in the form of a so-called D-cut, whereby an inner lateral cylinder surface of the spacer sleeve is shaped complementary to the flattening of the motor shaft. For the positive connection of the spacer sleeve to the motor shaft, the motor shaft can, for example, comprise a shoulder running around the motor axis and/or a ring fixed to the motor shaft, in particular a snap ring or a metal ring pressed onto the motor shaft, for example a copper ring or a steel ring, wherein the spacer sleeve can be arranged along the motor axis between the shoulder and the ring.

In embodiments, the electric motor comprises a distance along the motor axis between the brake rotor and the drive rotor for thermal and/or magnetic decoupling of the brake rotor from the drive rotor, the distance being from 1 mm to 10 mm, particularly from 3 mm to 5 mm. The distance ensures without additional components and thus particularly cost-effectively that the magnetisation of the brake rotor and thus the braking effect is not impaired by heat and/or magnetic fields emitted by the drive rotor.

A shielding element for thermal and/or magnetic shielding of the brake rotor from the drive rotor is arranged along the motor axis between the brake rotor and the drive rotor, the shielding element consisting of a plastic or a steel and/or being attached to the brake rotor. The shielding element ensures that the magnetisation of the brake rotor and thus the braking effect is not impaired by heat and/or magnetic fields emitted by the drive rotor. For the simplest possible construction of the electric motor, the shielding element can be integral with the spacer sleeve.

The shielding element can, for example, be annular, whereby the shielding element is aligned perpendicular to the motor axis, is centred on the motor axis and/or has the same outer diameter radially to the motor axis as the drive rotor.

In embodiments, the electric motor comprises a housing enclosing the stator, the drive rotor and the brake rotor, wherein the stator is attached to the housing and the motor shaft is mounted on the housing rotatably about the motor axis, so that the electric motor is designed as an internal rotor motor. Alternatively, the motor shaft can be attached to the housing and the stator can be rotatably mounted on the housing about the motor axis, so that the electric motor is designed as an external rotor motor.

In embodiments, the housing can protect the stator, the drive rotor and the brake rotor from foreign bodies, in particular from magnetically attractable foreign bodies such as metal chips, and/or magnetically shield them from an environment surrounding the electric motor in order to ensure reliable operation of the electric motor.

In embodiments, the stator is positively connected to the housing with respect to a rotation about the motor axis and/or a translation along the motor axis, wherein an adapter insert, an adapter ring arranged around the motor axis, is arranged along the motor axis between the stator and the housing.

A positive connection has the advantage over an adhesive connection, for example, that it is resistant even under high thermal and/or mechanical loads, so that a particularly reliable braking effect and thus a particularly safe electric motor is achieved. Compared to a press connection, a positive connection has the advantage that the mechanical load on the connected components is lower, which is particularly advantageous for the typically brittle material of the stator.

An adapter insert has the advantage that stators of different lengths can be installed in the same housing along the motor axis without changing the external dimensions of the electric motor.

By using stators and/or brake rotors of different lengths along the motor axis, it is possible to produce electric motors with braking torques of different strengths. If the length of the stator is not changed or if stators of different lengths are installed in housings of the same length with the aid of an adapter insert, electric motors with braking torques of different strengths and identical external dimensions can be produced. From such electric motors, an electric motor with a braking torque suitable for a specific application, for example for a vehicle flap with a specific mass, can be selected in a simple manner, without having to adapt other components of a drive system of the vehicle flap or the required installation space.

In embodiments, the permanent magnetic material of the stator is a ferrite. A ferrite magnet has the advantage of lower costs compared to a rare earth magnet but generates a lower magnetic field strength and thus a lower braking torque in the hysteresis brake. According to embodiments of the invention, this disadvantage can be overcome by selecting an outer radius of the brake rotor radially to the motor axis that is as large as possible and, in particular, corresponds to an outer radius of the drive rotor radially to the motor axis. As a result, the magnetic interaction between the stator and the brake rotor acts on the motor shaft with a large lever arm and generates a correspondingly large braking torque.

Embodiments of the invention relate to a use of the electric motor for driving a vehicle flap, wherein the electric motor drives the vehicle flap via a spindle drive.

In the case of a vehicle flap—which is often heavy in modern vehicles—it is particularly important that an unintentional closing of the vehicle flap, which can lead to serious injuries if a part of the body is trapped by the vehicle flap, is reliably prevented. Therefore, the electric motor according to embodiments of the invention, the braking effect of which occurs independently of a power supply to the electric motor and of a state of movement of the vehicle flap, is particularly suitable for driving a vehicle flap. Furthermore, the installation space available for an electric motor in vehicles is generally very limited, so that the particularly compact design of the electric motor according to embodiments of the invention is particularly suitable for use in a vehicle.

Embodiments of the invention relate to a method of manufacturing an electric motor, comprising the following steps: Fixing the drive rotor and the, non-magnetised, brake rotor on the motor shaft and arranging the motor shaft in the stator. The brake rotor is not yet magnetised when mounted on the motor shaft, so that the brake rotor can be easily mounted with common mounting tools that could magnetically interact with a magnetised brake rotor. Once the brake rotor is placed in the stator, the stator magnetises the brake rotor so that the hysteresis brake is ready for use.

In embodiments, the fixing of the drive rotor and the brake rotor on the motor shaft is carried out before the motor shaft is arranged in the stator, because the motor shaft is easier to access before it is arranged in the stator and the fixing is thus not hindered by magnetic interactions of the drive rotor, brake rotor, motor shaft and/or assembly tools with the stator.

In embodiments, the spacer sleeve is connected to the brake rotor with positive locking in order to obtain a particularly reliable connection. If the brake rotor is made of a material commonly used for hysteresis brakes, it can only be manufactured with a high manufacturing tolerance. Therefore, if the brake rotor and the spacer sleeve were manufactured independently of each other, there would be mechanical play between the two components, so that increased noise and wear could occur, especially when the electric motor changes direction. Since the usual materials for hysteresis brakes are brittle, the spacer sleeve cannot be connected to the brake rotor with a press connection.

The method comprises injection moulding a spacer sleeve into the brake rotor before fixing the brake rotor to the motor shaft, so that the spacer sleeve distances the brake rotor radially to the motor axis from the motor shaft after fixing. By injection moulding into the brake rotor, the spacer sleeve and the brake rotor are positively connected to each other without play and without mechanically stressing the brake rotor. In addition, no separate step is necessary for fastening the spacer sleeve to the brake rotor, for example by an adhesive connection. An adhesive connection would also have the disadvantage that it would require greater mechanical play between the spacer sleeve and the brake rotor, which could lead to poorer concentricity of the electric motor.

If the brake rotor is made of a material commonly used for hysteresis brakes, it can only be manufactured with a high manufacturing tolerance, so that when the motor shaft with the brake rotor attached to it rotates around the motor axis, an imbalance can occur that can lead to vibrations, increased noise, and increased wear. Machining the brake rotor for balancing is not possible due to the brittleness of the brake rotor.

The method therefore preferably comprises balancing the motor shaft with respect to rotation about the motor axis by reworking the drive rotor after fixing the drive rotor and the brake rotor on the motor shaft and before placing the motor shaft in the stator.

The reworking of the drive rotor for balancing the motor shaft can be carried out using processes that are known from the production of conventional electric motors. According to embodiments of the invention, the reworking of the drive rotor can also compensate for a possible imbalance of the brake rotor in order to achieve a smoothly running and low-wear electric motor.

Balancing is carried out before the motor shaft is placed in the stator, because the motor shaft is easier to access before it is placed in the stator and balancing is thus not hindered by magnetic interactions of the drive rotor, brake rotor, motor shaft and/or reworking tools with the stator.

BRIEF DESCRIPTION

Some of the embodiments will be described in detail, with references to the following Figures, wherein like designations denote like members, wherein.

DETAILED DESCRIPTION

Figure 1:
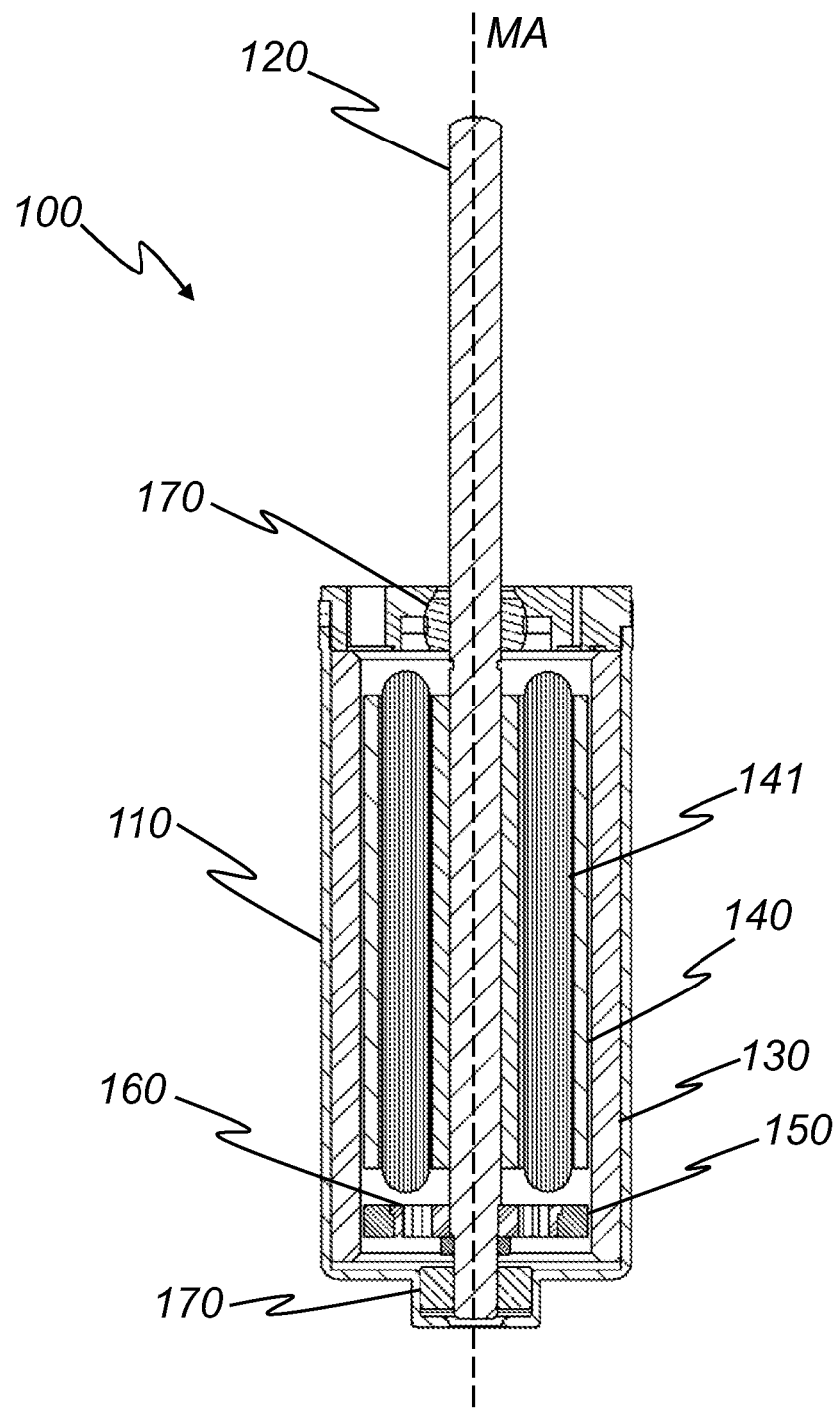
FIG. 1 shows a schematic longitudinal section of an electric motor according to embodiments of the invention.

FIG. 1 shows a schematic longitudinal section along the motor axis MA of an electric motor 100 according to embodiments of the invention.

The electric motor 100 shown comprises a stator 130 of hollow cylindrical shape and arranged coaxially with the motor axis MA and made of a permanent magnetic material, for example a ferrite.

The electric motor 100 shown includes a motor shaft 120 disposed coaxially with the motor axis MA and partially within the stator 130 and mounted for rotation relative to the stator 130 about the motor axis MA, and a drive rotor 140 disposed within the stator 130 and mounted on the motor shaft 120 and including a plurality of coils 141 for driving rotation of the motor shaft 120 relative to the stator 130 about the motor axis MA.

The electric motor 100 shown comprises a braking rotor 150, for example made of an aluminium-nickel-cobalt alloy, arranged in the stator 130, fixed along the motor axis MA at a distance of, for example, 3 mm to 5 mm next to the drive rotor 140 on the motor shaft 120 and magnetisable by the stator 130.

For example, an outer radius of the brake rotor 150 radial to the motor axis MA corresponds to an outer radius of the drive rotor 140 radial to the motor axis MA.

The brake rotor 150 is spaced from the motor shaft 120 radially to the motor axis MA by a spacer sleeve 160, for example made of a plastic material.

The brake rotor 150 and the spacer sleeve 160 are described in more detail with reference to FIGS. 2 to 4.

The electric motor 100 shown comprises a housing 110 enclosing the stator 130, the drive rotor 140 and the brake rotor 150, the stator 130 being fixed to the housing 110, and the motor shaft 120 being mounted on the housing 110 rotatably about the motor axis MA. For example, the motor shaft 120 is mounted to the housing 110 at each end of the housing 110 along the motor axis MA via a respective bearing 170.

Figure 2:
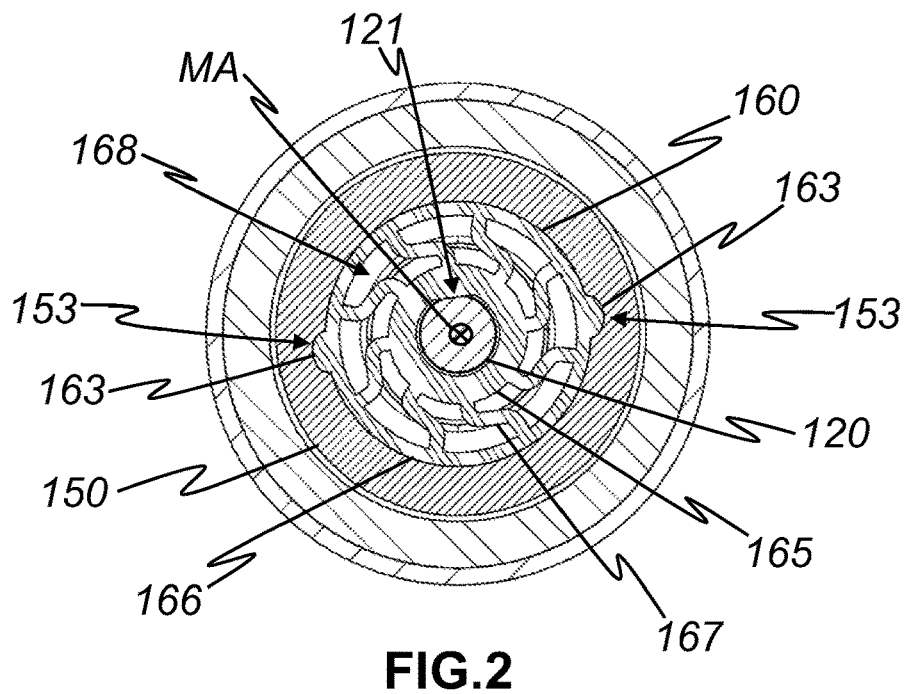
FIG. 2 shows a schematic cross-section of the brake rotor of the electric motor from FIG. 1.

FIG. 2 shows a schematic cross-section perpendicular to the motor axis MA through the brake rotor 150 of the electric motor 100 from FIG. 1.

FIG. 2 shows that the spacer sleeve 160 is positively connected to the motor shaft 120 and the brake rotor 150 with respect to rotation about the motor axis MA.

The spacer sleeve 160 shown has a number of projections 163, for example four projections 163 each offset by 90° about the motor axis MA, on an outer lateral cylinder surface of the spacer sleeve 160 (only two projections are visible in the sectional plane shown). The projections are rounded, for example. The brake rotor 150 comprises depressions 153 of complementary shape to the projections 163, in which the projections 163 engage positively with respect to rotation about the motor axis MA.

For positive connection of the spacer sleeve 160 to the motor shaft 120, an outer surface of the motor shaft 120 shown is flattened on one side, wherein an inner lateral cylindrical surface of the spacer sleeve 160 interacts positively with the flattening 121 of the motor shaft 120 with respect to a rotation about the motor axis MA.

The spacer sleeve 160 shown comprises an inner cylinder 165 abutting the motor shaft 120 and coaxial with the motor axis MA and an outer cylinder 166 abutting the brake rotor 150 and coaxial with the motor axis MA. The outer cylinder 166 is radially spaced from the inner cylinder 165 with respect to the motor axis MA and is connected to the inner cylinder 165 only by a number of, for example eight, curved webs 167. Recesses 168 are located between the webs 167.

Figure 3:
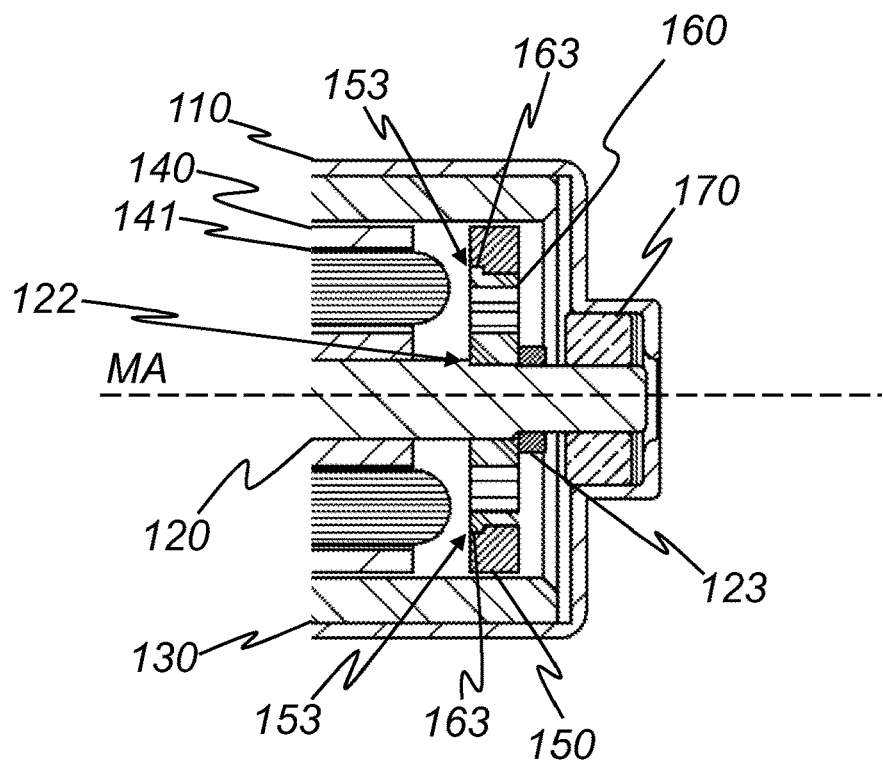
FIG. 3 shows an enlarged section of FIG. 1 in the area of the brake rotor.

FIG. 3 shows an enlarged section of FIG. 1 in the area of the brake rotor 150.

FIG. 3 shows that the spacer sleeve 160 is positively connected to the motor shaft 120 and to the brake rotor 150 with respect to a translation along the motor axis MA.

For positive connection of the spacer sleeve 160 to the brake rotor 150 with respect to a translation along the motor axis MA, the spacer sleeve 160 shown has a number of projections 163, for example four projections 163 each offset by 90° about the motor axis MA on an outer lateral cylinder surface of the spacer sleeve 160 (only two projections are visible in the sectional plane shown). The brake rotor 150 comprises depressions 153 of complementary shape to the projections 163, in which the projections 163 engage positively with respect to a translation along the motor axis MA.

For positive connection of the spacer sleeve 160 to the motor shaft 120 with respect to translation along the motor axis MA, the motor shaft 120 shown comprises a shoulder 122 arranged around the motor axis MA and a ring 123 fixed to the motor shaft 120, for example a steel ring pressed onto the motor shaft 120, the spacer sleeve 160 being arranged along the motor axis MA between the shoulder 122 and the ring 123.

Figure 4:
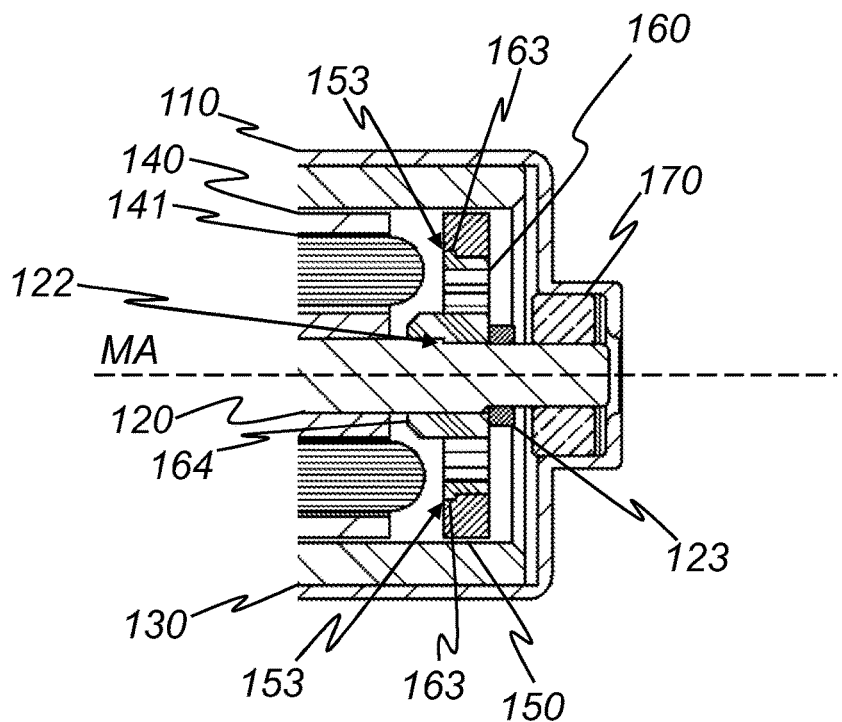
FIG. 4 shows an enlarged section of FIG. 1 in the area of the brake rotor with an alternatively designed spacer sleeve.

FIG. 4 shows an enlarged section of FIG. 1 in the area of the brake rotor 150 with an alternatively designed spacer sleeve 160.

The spacer sleeve 160 shown in FIG. 4 differs from the spacer sleeve 160 shown in FIG. 3 in that it has a guide section 164 extended relative to the brake rotor 150 along the motor axis MA for guiding the motor shaft 120 in the spacer sleeve 160. The guide section 164 prevents tilting of the spacer sleeve 160 relative to the motor shaft 120 and thereby improves the smooth running and durability of the electric motor 100.

Figure 5:
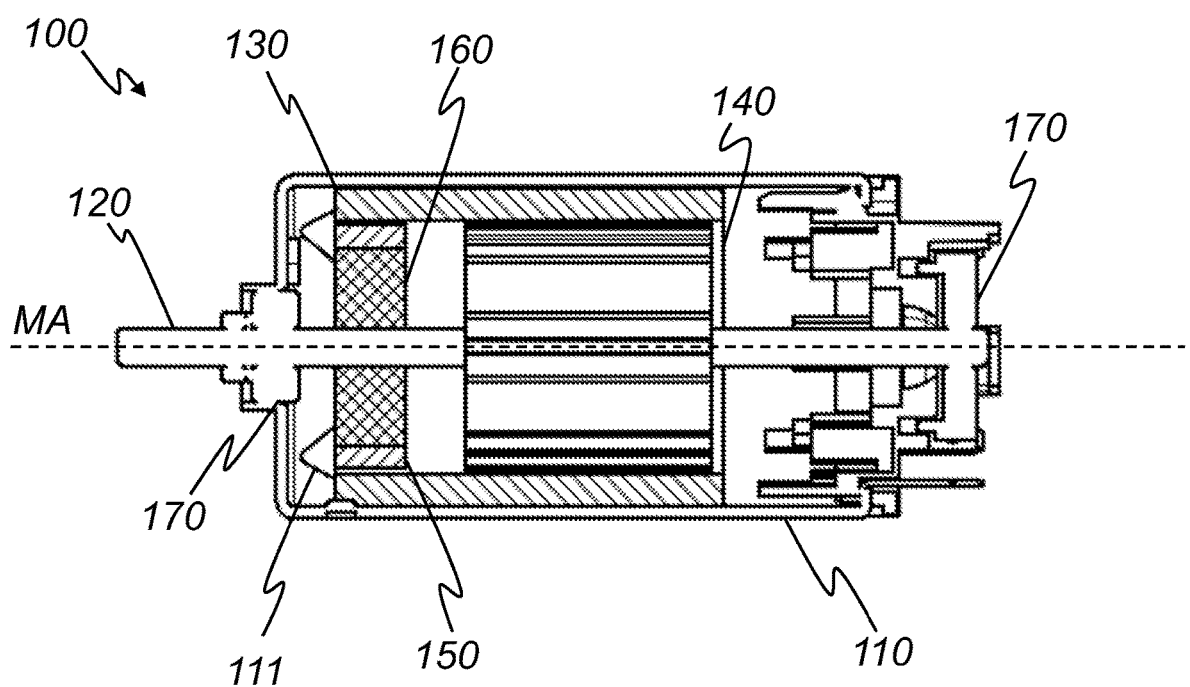
FIG. 5 shows a schematic longitudinal section of another electric motor according to embodiments of the invention.

FIG. 5 shows a schematic longitudinal section along the motor axis MA of a further electric motor 100 according to embodiments of the invention.

The electric motor 100 shown in FIG. 5 differs from the electric motor 100 shown in FIG. 1 in that the stator 130 is positively connected to the housing 110 with respect to a translation along the motor axis MA, wherein an adapter insert 111, for example an adapter ring arranged around the motor axis MA, is arranged along the motor axis MA between the stator 130 and the housing 110.

Figure 6:
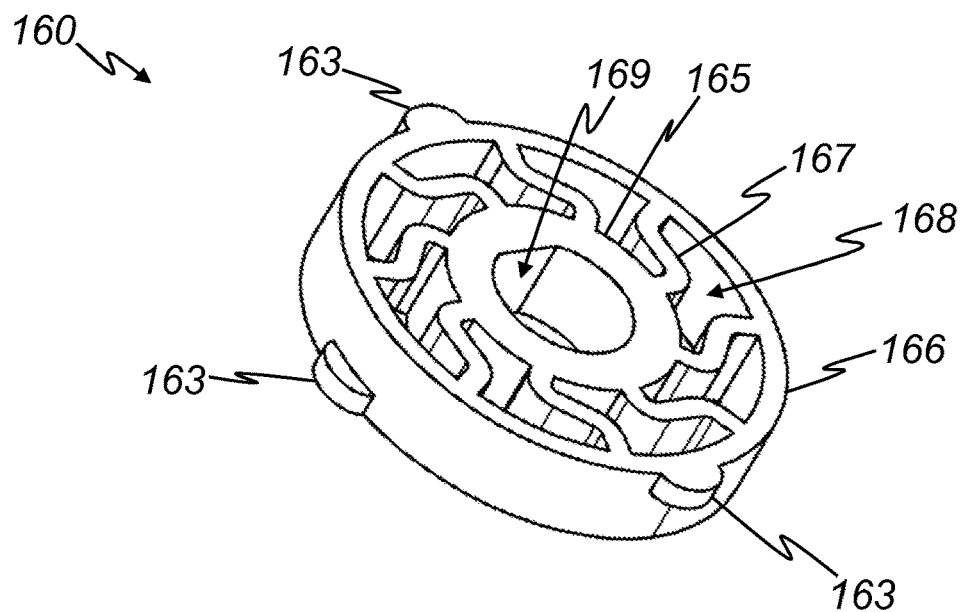
FIG. 6 shows a schematic view of the spacer sleeve of the electric motor from FIG. 1.

FIG. 6 shows a schematic view of the spacer sleeve 160 of the electric motor 100 from FIG. 1.

The spacer sleeve 160 shown has a number of projections 163, for example four projections 163 each offset by 90°, on an outer cylindrical surface of the spacer sleeve 160 for positive connection of the spacer sleeve 160 to the brake rotor (not shown) of the electric motor 100 (only three projections are visible in the view shown). The projections are rounded, for example.

For positive connection of the spacer sleeve 160 to the motor shaft (not shown) of the electric motor 100, an inner cylindrical surface of the spacer sleeve has a flattening 169.

The spacer sleeve 160 shown comprises an inner cylinder 165 for contact with the motor shaft 120 of the electric motor 100 and an outer cylinder 166 for contact with the brake rotor 150. The outer cylinder 166 is spaced from the inner cylinder 165 and is connected to the inner cylinder 165 only by a number of, for example eight, curved webs 167. Recesses 168 are located between the webs 167.

Figure 7:
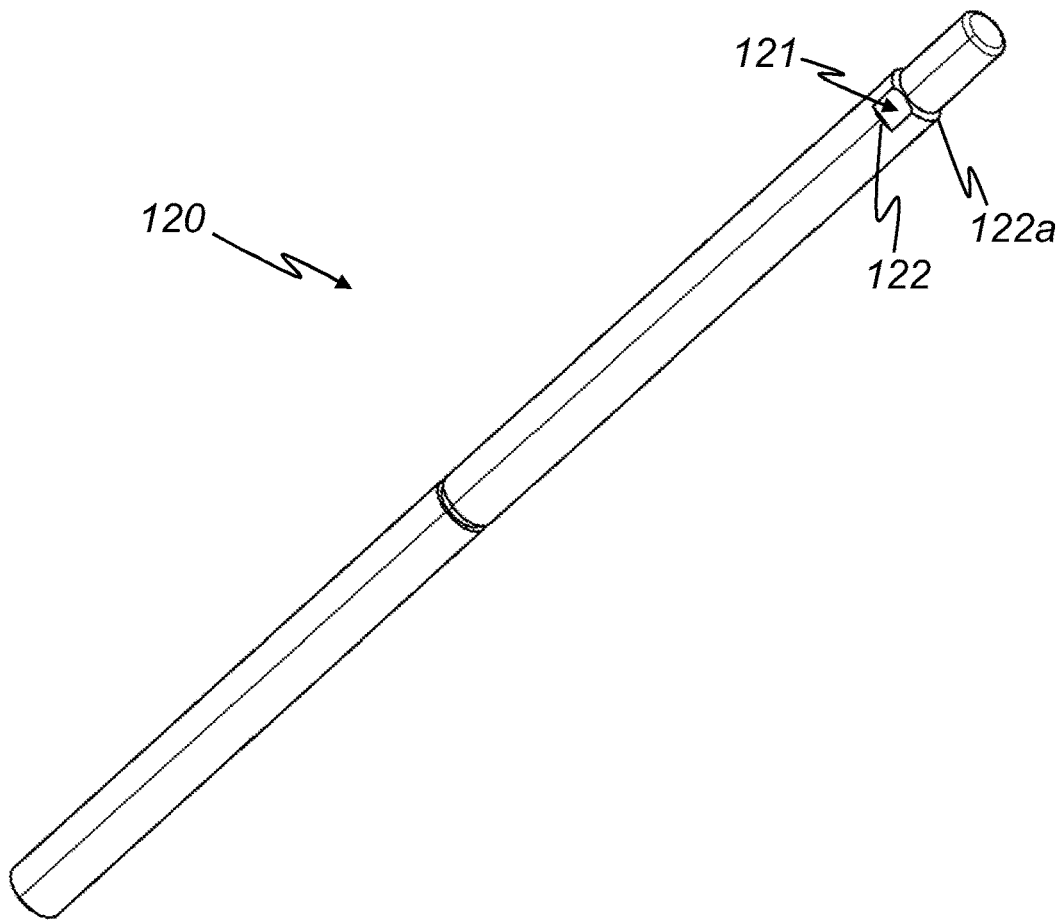
FIG. 7 shows a schematic view of the motor shaft of the electric motor from FIG. 1.

FIG. 7 shows a schematic view of the motor shaft 120 of the electric motor 100 of FIG. 1.

For positive connection of the spacer sleeve (not shown) of the electric motor 100 to the motor shaft 120 with respect to a rotation about the motor shaft 120, an outer surface of the motor shaft 120 shown is provided with a flattening 121 on one side. An edge of the flattening 121 also defines a shoulder 122 for positive connection of the motor shaft 120 to the spacer sleeve 160 with respect to translation along the motor shaft 120.

A ring (not shown) may be secured to the motor shaft 120 at a further shoulder 122a, such that the spacer sleeve 160 is positively retained along the motor shaft 120 between the shoulder 122 and the ring with respect to translation along the motor shaft 120.

| List of reference signs | |
|---|---|
| 100 | Electric motor |
| 110 | Housing |
| 111 | Adapter insert |
| 120 | Motor shaft |
| 121 | Flattening |
| 122 | Shoulder |
| 123 | Ring |
| 130 | Stator |
| 140 | Drive rotor |
| 141 | Coil |
| 150 | Brake rotor |
| 153 | Depression |
| 160 | Spacer sleeve |
| 163 | Projection |
| 164 | Guide section |
| 165 | Inner cylinder |
| 166 | Outer cylinder |
| 167 | Web |
| 168 | Recess |
| 169 | Flattening |
| 170 | Bearing |
| MA | Motor axis |

The invention claimed is:

1. An electric motor for driving a vehicle flap, the electric motor comprising:
   a. a hollow-cylindrical shaped stator having a permanent magnetic material and arranged coaxially to a motor axis;
   b. a motor shaft arranged coaxially to the motor axis and at least partially in the stator and mounted rotatably relative to the stator about the motor axis;
   c. a drive rotor disposed in the stator and mounted on the motor shaft, including a plurality of coils for driving rotation of the motor shaft relative to the stator about the motor axis; and
   d. a brake rotor arranged in the stator and fixed along the motor axis next to the drive rotor on the motor shaft, the brake rotor being magnetisable by the stator;
   wherein the brake rotor is spaced from the motor shaft radially to the motor axis by a spacer sleeve;
   wherein the spacer sleeve is plastic;
   wherein the spacer sleeve contains a number of recesses for reducing thermal expansion of the spacer sleeve; and
   wherein the spacer sleeve comprises an inner cylinder in contact with the motor shaft, and an outer cylinder in contact with the brake rotor, wherein the outer cylinder is spaced from the inner cylinder radially to the motor axis and is connected to the inner cylinder only by a number of webs, wherein the recesses are located between the webs.

2. The electric motor according to claim 1, wherein an outer radius of the brake rotor radially to the motor axis corresponds to an outer radius of the drive rotor radially to the motor axis.

3. The electric motor according to claim 1, wherein the spacer sleeve is positively connected to the motor shaft and/or to the brake rotor with respect to a rotation about the motor axis and/or with respect to a translation along the motor axis.

4. The electric motor according to claim 1, further comprising a distance along the motor axis between the brake rotor and the drive rotor for thermal and/or magnetic decoupling of the brake rotor from the drive rotor.

5. The electric motor according to claim 1, further comprising a housing enclosing the stator, the drive rotor and the brake rotor, the stator being fixed to the housing, and the motor shaft being mounted on the housing rotatably about the motor axis.

6. The electric motor according to claim 5, wherein the stator is positively connected to the housing with respect to a rotation about the motor axis and/or a translation along the motor axis, wherein an adapter insert is arranged along the motor axis between the stator and the housing.

7. The electric motor according to claim 1, wherein the permanent magnetic material of the stator is a ferrite.

8. The electric motor according to claim 1, wherein the webs do not run in a straight line radially to the motor axis but are curved.

9. A method of manufacturing an electric motor, the method comprising:
- providing a hollow-cylindrical shaped stator having a permanent magnetic material;
- providing a motor shaft;
- providing a drive rotor, including a plurality of coils for driving rotation of the motor shaft relative to the stator about the motor axis;
- providing a brake rotor, the brake rotor being magnetisable by the stator; and
- providing a spacer sleeve;
- fixing the drive rotor and the brake rotor on the motor shaft; and
- placing the motor shaft in the hollow-cylindrical shaped stator;
- wherein the brake rotor is spaced from the motor shaft radially to the motor axis by the spacer sleeve;
- wherein the spacer sleeve is made of plastic;
- wherein the spacer sleeve contains a number of recesses for reducing thermal expansion of the spacer sleeve;
- wherein the spacer sleeve comprises an inner cylinder in contact with the motor shaft, and an outer cylinder in contact with the brake rotor, wherein the outer cylinder is spaced from the inner cylinder radially to the motor axis and is connected to the inner cylinder only by a number of webs, wherein the recesses are located between the webs.

10. The method according to claim 9, further comprising:
balancing the motor shaft with respect to rotation about the motor axis by reworking the drive rotor after fixing the drive rotor and the brake rotor on the motor shaft and before placing the motor shaft in the stator.

* * * * *